(12) United States Patent
Yamada

(10) Patent No.: US 6,209,402 B1
(45) Date of Patent: Apr. 3, 2001

(54) MEASURING ELEMENT, MASS AIR FLOW METER THEREWITH AND COMPENSATING METHOD FOR ACCURATELY MEASURING AIR FLOW

(75) Inventor: Masamichi Yamada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/008,331

(22) Filed: Jan. 16, 1998

(30) Foreign Application Priority Data

Jan. 16, 1997 (JP) ................................................ 9-005292

(51) Int. Cl.[7] ........................................................ G01F 1/66
(52) U.S. Cl. ............................................ 73/861.26; 73/204
(58) Field of Search .................................. 73/204.14, 204, 73/861.26, 204.18; 374/40; 364/571.01

(56) References Cited

U.S. PATENT DOCUMENTS

| 4,651,564 | * | 3/1987 | Johnson et al. ........................ 73/204 |
| 5,038,304 | * | 8/1991 | Bonne ............................. 364/571.01 |
| 6,019,505 | * | 2/2000 | Bonne et al. ........................... 374/40 |

FOREIGN PATENT DOCUMENTS

| 40 22 024 | 1/1991 | (DE) . |
| 42 19 454 | 12/1993 | (DE) . |
| 0 353 996 | 2/1990 | (EP) . |
| 2-307019 | 12/1990 | (JP) . |

\* cited by examiner

Primary Examiner—Benjamin R. Fuller
Assistant Examiner—Jewel V. Thompson
(74) Attorney, Agent, or Firm—Evenson, McKeown, Edwards & Lenahan, P.L.L.C.

(57) ABSTRACT

An improved measuring element for a mass air flow meter is provided with a temperature sensor for detecting a typical temperature indicative of the impact of heat on a heating resistor. The element is formed on a heat transfer pass from a configuration member supporting a substrate on which the heating resistor for measuring an air flow rate is formed, and an air temperature sensor for detecting air temperature, formed on the substrate and out of the air flow impinging the heating resistor.

8 Claims, 10 Drawing Sheets

OUTPUT SIGNAL OF AIR FLOW RATE

DIRECTION OF AIR FLOW

MEASURING ELEMENT, MASS AIR FLOW METER THEREWITH AND COMPENSATING METHOD FOR ACCURATELY MEASURING AIR FLOW

BACKGROUND AND SUMMARY OF THE INVENTION

This application claims the priority of Japanese application 9-005292, the disclosure of which is expressly incorporated by reference herein.

The present invention relates to a measuring element for a mass air flow meter and a mass air flow meter and, more particularly, to an apparatus suitable for the measurement of an air flow rate taken into an internal combustion engine.

In the prior art, a thermal type air flow meter which can directly detect an amount of a mass air flow is provided in electronically controlled fuel injection equipment for an internal combustion engine of an automobile, etc., for measuring the amount of intake air. Above all, attention is given to a mass air flow meter and a measuring element used therefor, manufactured by using the semiconductor micromachining technique, from view points of the reduction of cost and the desire for a low electric power consumption. The mass air flow meter in which the conventional semiconductor substrate is used is disclosed in Japanese Patent Application Laid-Open No. 60-142268 (1985). The technique disclosed in the above publication places the accent on the reduction of manufacturing cost.

Therefore, the above-mentioned prior art fails to consider an air flow rate-temperature characteristic when the amount of intake air is measured. Namely, there is a problem that the accuracy of the measurement of the air flow rate is insufficient.

The problem of the above described conventional technique is explained with reference to FIG. 16 which is a plan view of the conventional measuring element for a mass air flow meter. In FIG. 16, reference numeral 1 designates a measuring element for the conventional mass air flow meter. The measuring element 1 has two bridges 23a, 23b formed by insulator film, and bridging air spaces 22a, 22b, 22c formed by anisotropic-etching a semiconductor substrate such as a silicon substrate. The bridge 23a is positioned at an upstream side of the direction of an air flow, and the bridge 23b at a downstream side.

A heating resistor 20 is arranged so as to sandwich the air space 22c between the two bridges 23a, 23b. Temperature sensing resistors 21a, 21b are arranged the sides of the heating resistor 20. Further, an air temperature compensating resistor 4a for measuring the air temperature is arranged at a portion of the upstream side of the air space 22a. Because the air spaces 22a, 22b, 22c are formed by anisotropic-etching the semiconductor substrate, through the opening portion of the electrically insulated film, they are connected continuously to one another below the bridges 23a, 23b. In such an air flow meter, the heating resistor 20 is heated to a predetermined temperature higher than the air temperature determined by the temperature compensating resistor 4a. The amount of air flow is measured from the difference of temperature between the upstream temperature sensing resistor 21a and the downstream temperature sensing resistor 21b, using the cooling effect of the air stream.

In the prior art constructed as described above, the variation of the temperature of the intake air is compensated only by a bridge circuit constructed by using the temperature compensating resistor 4a and the heating resistor 20. Namely, in the prior art, the temperature-dependent variation of the physical properties of air, e.g., the density, the dynamic viscosity and the thermal conductivity, is not considered. Therefore, a suitable air flow amount—air temperature characteristic can not be obtained. Further, in the event that the sensor is used in harsh environments such as in an automobile, the heat due to the increase of the temperature of the internal combustion engine is conducted to the heating resistor 20, the temperature compensating resistor 4a and the temperature sensing resistors 21a, 21b, and thus has adverse effects on the measurement accuracy. This problem also has not been solved in the prior art.

An object of the present invention is to provide to a measuring element for a mass air flow meter and a mass air flow meter which can measure the amount of air flow with a high degree of accuracy.

To attain the above-mentioned object, the present invention preferably has the following configuration.

According to a first aspect of the present invention, in a measuring element for a mass air flow meter, a temperature sensor for detecting a typical temperature indicative of the impact of heat on a heating resistor, is formed on a heat transfer pass from a configuration member supporting a substrate on which the heating resistor for measuring an air flow rate is formed. The heat transfer pass is positioned at the support portion of the substrate supported by the configuration member, or at a portion between that support portion and the heating resistor.

According to another aspect of the present invention, a measuring element for a mass air flow meter is provided with a temperature sensor for detecting a typical temperature indicative of the impact of heat on a heating resistor, formed on a heat transfer pass from a configuration member supporting a substrate on which the heating resistor for measuring an air flow rate is formed, and an air temperature sensor for detecting air temperature, formed on the substrate and out of a line of the air flow touching the heating resistor.

According to a further aspect of the present invention, a mass air flow meter has a measuring element for a mass air flow meter including a temperature sensor for detecting a typical temperature indicative of the impact of heat on a heating resistor, formed on a heat transfer pass from a configuration member supporting a substrate on which the heating resistor for measuring an air flow rate is formed; an operating circuit for supplying a current to the measuring element and detecting a signal indicative of the amount of the air flow; a control circuit for calculating the amount of the air flow based on the signal indicative of the amount of the air flow; and a memory for storing the compensation data for an air flow rate-substrate temperature characteristic. The control circuit compensates the amount of the air flow by using the compensation data, and the typical temperature obtained from the substrate-temperature sensor.

According to a further aspect of the present invention, a mass air flow meter has a measuring element for a mass air flow meter including a temperature sensor for detecting a typical temperature indicative of the impact of heat on a heating resistor, formed on a heat transfer pass from a configuration member supporting a substrate on which the heating resistor for measuring an air flow rate is formed; an operating circuit for supplying a current to the measuring element and detecting a signal indicative of the amount of the air flow; a control circuit for calculating the amount of the air flow based on the signal indicative of the amount of the air flow; and a memory for storing the compensation data for an air flow rate-substrate temperature characteristic and an air flow rate—air temperature characteristic. The control circuit compensates the amount of the air flow by using the compensation data, the air temperature obtained from the air-temperature sensor and the typical temperature obtained from the substrate-temperature sensor.

These and other features of the invention that will be apparent to those skilled in the art from the following detailed description of the invention, taken together with the accompanying drawings.

BRIEF DESCRIPTION OF THE DRAWINGS

Corresponding numerals and symbols in different figures refer to corresponding parts unless otherwise specified.

DETAILED DESCRIPTION OF THE DRAWINGS

Figure 1:
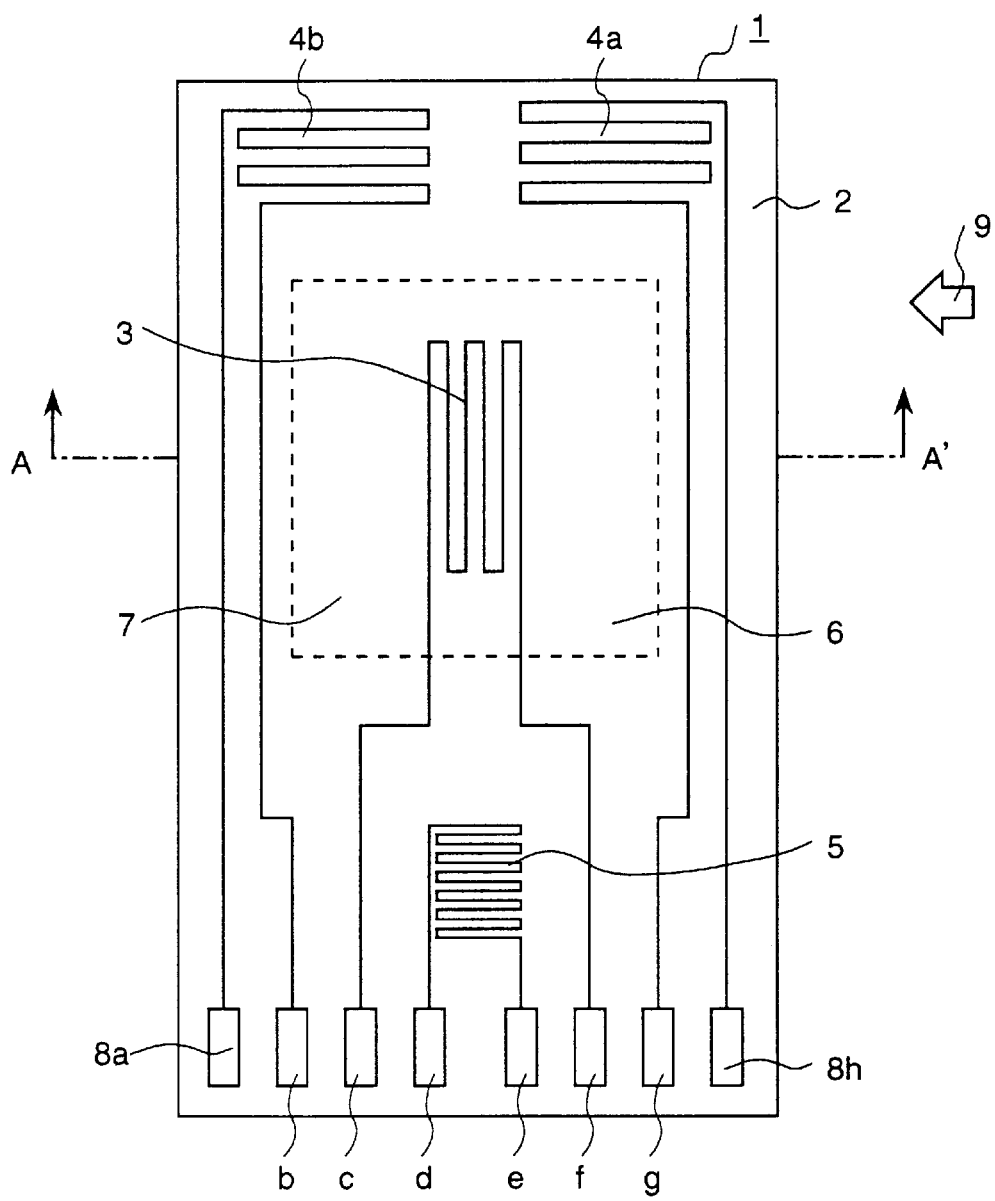
FIG. 1 is a plan view of a measuring element for the mass air flow meter according to a first embodiment of the present invention.
Figure 2:
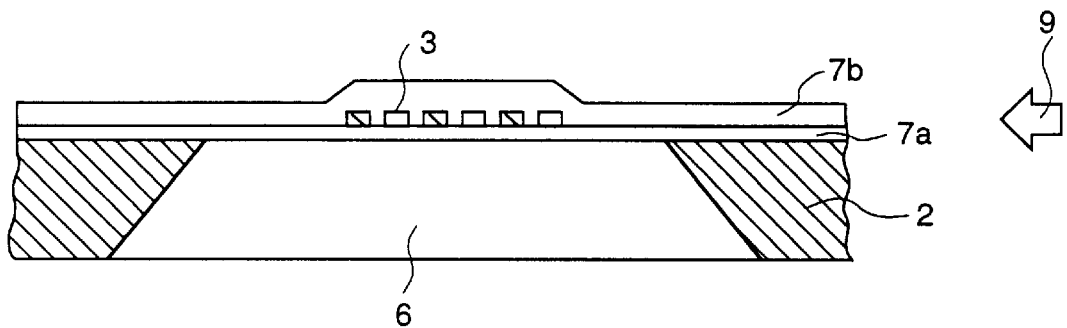
FIG. 2 is a sectional view taken along the line A–A' of the mass air flow meter of FIG. 1.

In FIGS. 1 and 2, the measuring element 1 comprises a semiconductor substrate 2 of silicon and the like having an air space 6 formed from the bottom surface to a boundary surface of an insulator film 7a by anisotropic etching. A heating resistor 3 is formed on the insulator film 7a at the air space 6. A temperature compensating resistor 4a constructs a bridge circuit with the heating resistor 3 for measuring air temperature. An air temperature sensor or a second temperature sensor 4b formed at the top portion of the substrate 2 for measuring the air temperature or the temperature of intake air. Terminal electrodes 8a through 8h are provided on the element 1, and a substrate temperature sensor 5 or a first temperature sensor is formed between the heating resistor 3 and the terminal electrodes 8a–8h for measuring the temperature of a support portion or the temperature of the substrate at the support portion 2a (FIG. 5) where the substrate 2 is supported by another configuration member. An insulator film 7b is provided for protecting each of the resistors.

In such the configuration, a heating current is supplied to the heating resistor 3 so that its temperature may become higher by a predetermined temperature than that of the temperature compensating resistor 4a arranged at the top of a passage of air flow 9. The air flow rate is measured from the value of the heating current supplied to the heating resistor 3, based on the cooling effect of the heating resistor 3 by the air flow 9. The insulator film 7 in the neighborhood of the air space 6 and the heating resistor 3 are formed to improve measurement accuracy by preventing heat transfer from the heating resistor 3 to the substrate 2.

As shown in FIG. 1, the temperature compensating resistor 4a and the second temperature sensor 4b are positioned at the top portion of the substrate 2 and at a portion projected into the air flow passage. As a result, the heating resistor 3 has no influence on the heated air flow 9 whether forward flow or backward flow. Further, because the second temperature sensor 4b is formed on the portion of the substrate out of the region of the air flow touched by the heating resistor 3, the heat impact from the heating resistor 3 is avoided, and thus the air temperature is correctly detected.

Figure 3:
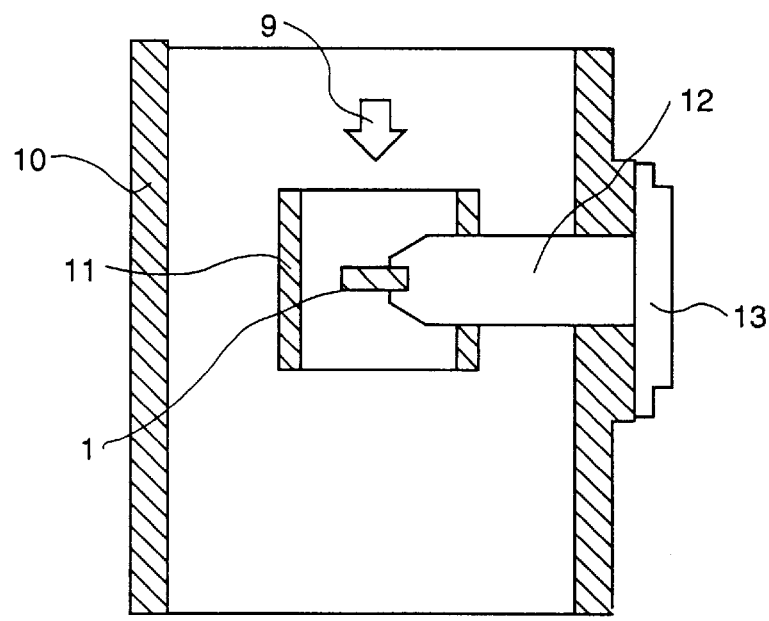
FIG. 3 is a sectional view of the mass air flow meter according to a first embodiment of the present invention.

In FIG. 3, the measuring element 1 shown in FIG. 1 is installed in a mass air flow meter. More specifically, a mass air flow meter having the measuring element 1 is mounted in an intake pipe of an automobile internal combustion engine to measure the amount of the aspirated air flow.

The mass air flow meter according to the present embodiment comprises the measuring element 1, a housing part 12 and an external circuit 13. The measuring element 1 is arranged in a sub-tube 11 within an air intake pipe 10. The external circuit 13 is electrically connected through the housing part 12 to a terminal electrode 8 of the measuring element 1. While the aspirated air flow is normally flowed into a direction of the air flow 9 designated by an arrow, it may be flowed into a direction opposed to the direction of the arrow according to the condition of the internal combustion engine (a reverse flow).

Figure 4:
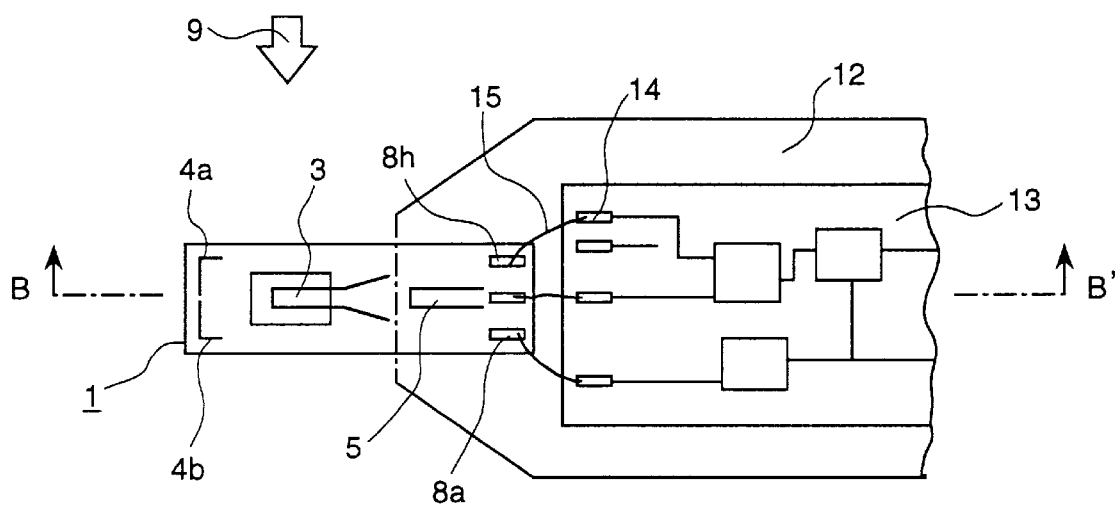
FIG. 4 is an enlarged view of the measuring element part of FIG. 3.
Figure 5:
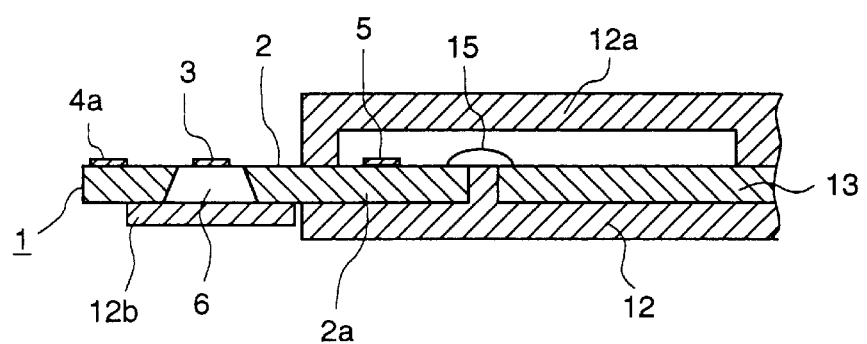
FIG. 5 is a sectional view taken along the line B–B' of the measuring element part of FIG. 4.

As shown in FIGS. 4 and 5, the measuring element 1 is supported by the housing part 12 at the support portion 2a of the substrate 2 so that two sides of each of the temperature compensating resistor 4a and the second temperature sensor 4b can be exposed to the air flow 9. Further, the external circuit 13 having a terminal electrode 14 and a signal processing circuit (including an operating circuit and a control circuit described later) is also fixed to the housing part 12.

The measuring element 1 and the external circuit 13, that is, the terminal electrodes 8a through 8h, 14 are electrically connected by wire-bonding through gold lines 15 to each other. Thereafter, the first temperature sensor 5, the gold lines 15, electrode terminals 8a–8h and 14, and the external circuit 13 are sealed and protected by the protective casing 12a to avoid direct contact with air. Therefore, the temperature of the substrate 2 can be measured correctly, independently of the effect of the air flow 9. Namely, the variation of the measurement temperature of the first temperature sensor 5 due to the impact of heat transfer from the air flow can be suppressed.

As to the installed measuring element 1, the top face and the bottom face of the air space 6 are completely isolated by the insulator film 7a and the lid plate 12b (which is isolated from or integrated with the housing part 12), respectively, from the air flow, as seen from FIGS. 2 and 5. Because the mass air flow meter according to the present embodiment has an air space 6 not opening to the air flow different from the prior art, the dust which causes undesired influences on the measurement of the air flow rate never accumulate within the air space. As a result, it is possible to measure the air flow rate with a high degree of accuracy.

Figure 6:
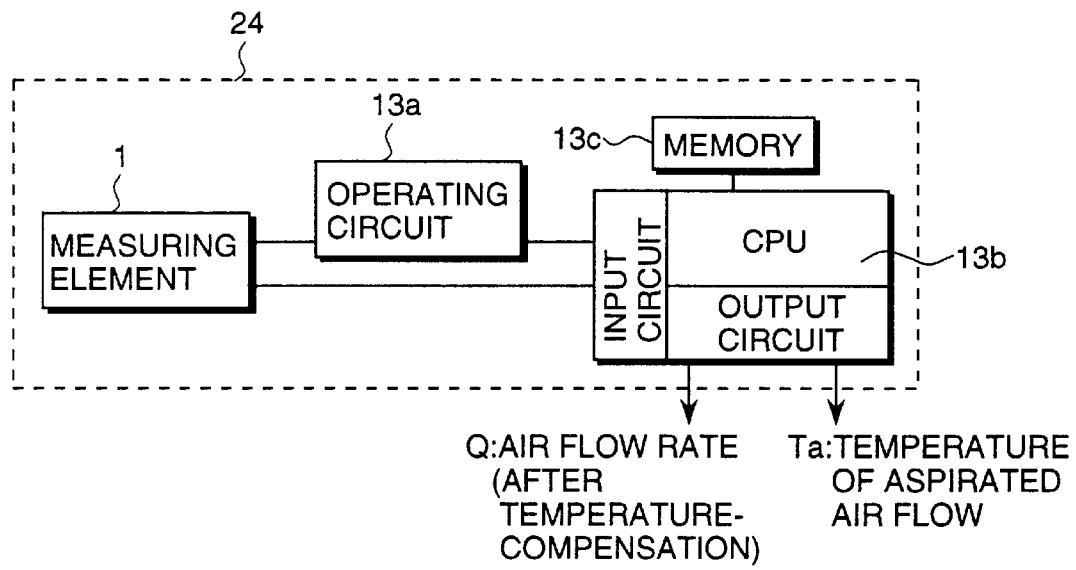
FIG. 6 is a block diagram showing the circuit of the mass air flow meter according to the present invention.

FIG. 6 schematically shows the mass air flow meter 24 of the first embodiment. The mass air flow meter according to second and third embodiments described below also has the same circuit configuration as that shown in FIG. 6.

The mass air flow meter 24 includes the measuring element 1 shown in FIG. 1, and the external circuit 13. The external circuit has an operating circuit 13a for supplying an electric current to the measuring element 1 and detecting an signal indicative of the amount of an air flow. A control circuit 13b has an input circuit for inputting the air-flow-amount signal from the measuring element 1 through an A/D converter, a CPU for calculating and processing the amount of the air flow, and an output circuit for outputting the processed results. A memory 13c is provided for pre-storing data for compensation of the air flow rate (signal) measured based on the substrate temperature (ex. the temperature of the support portion) detected by the first temperature sensor 5 and/or air temperature (ex. the temperature of intake air) detected by the second temperature sensor 4b.

Figure 7:
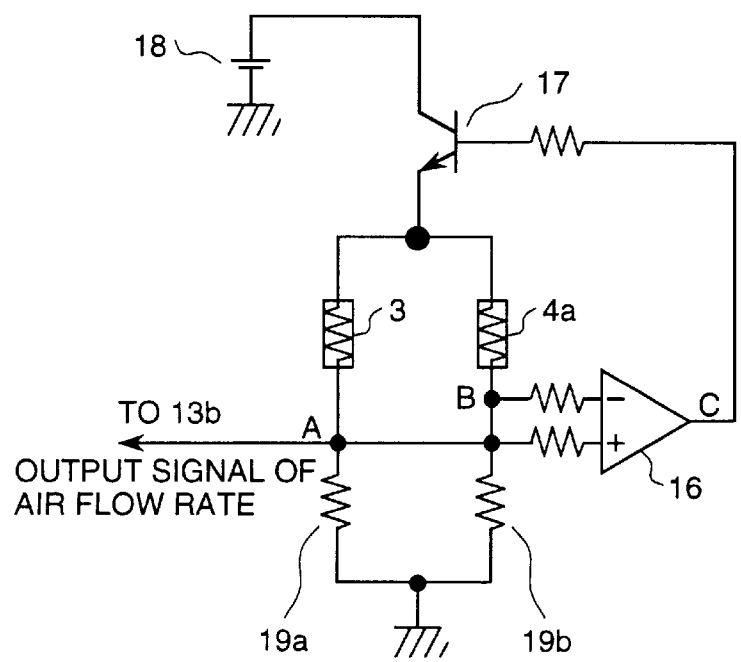
FIG. 7 is a circuit diagram for measurement of an air flow rate, used in the mass air flow meter according to the first embodiment of the present invention.
Figure 8:
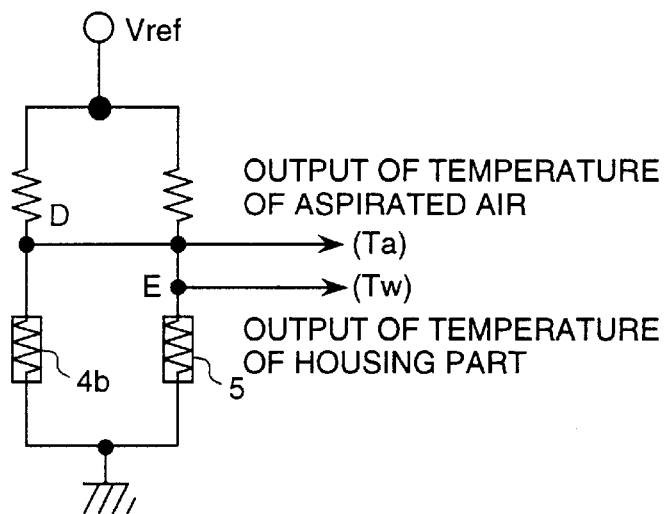
FIG. 8 is a circuit diagram for measurement of temperature, used in the mass air flow meter according to the first embodiment of the present invention.

FIG. 7 shows a bridge circuit for measurement of an air flow rate including the heating resistor 3 of FIG. 1, the temperature compensating resistor 4a and a part of the operating circuit 13a of FIG. 6. The operating circuit 13a includes a differential amplifier 16, a transistor 17, a power source 18, and resistors 19a, 19b. FIG. 8 shows a measuring circuit including the first temperature sensor 5 of FIG. 1, the second temperature sensor 4b and a part of the operating circuit 13a of FIG. 6.

Figure 9:
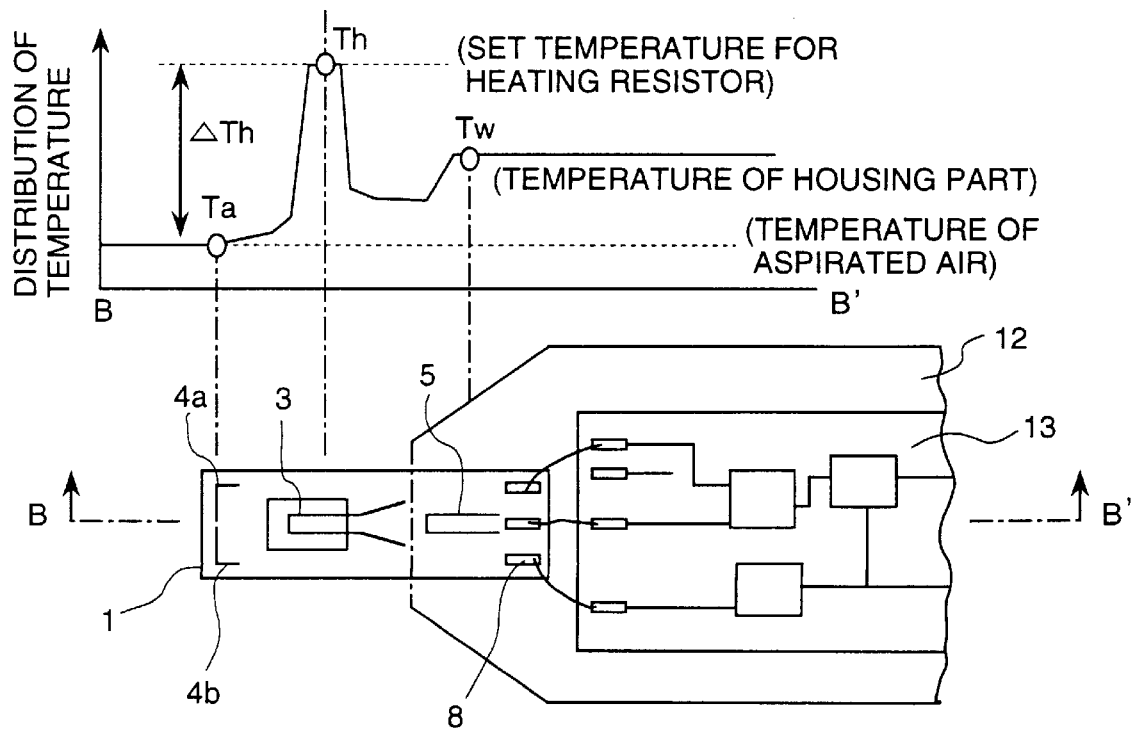
FIG. 9 is a view showing the relationship between a portion of the measuring element shown in FIG. 1 and the temperature distribution on the line B–B' of the measuring element.
Figure 10A:
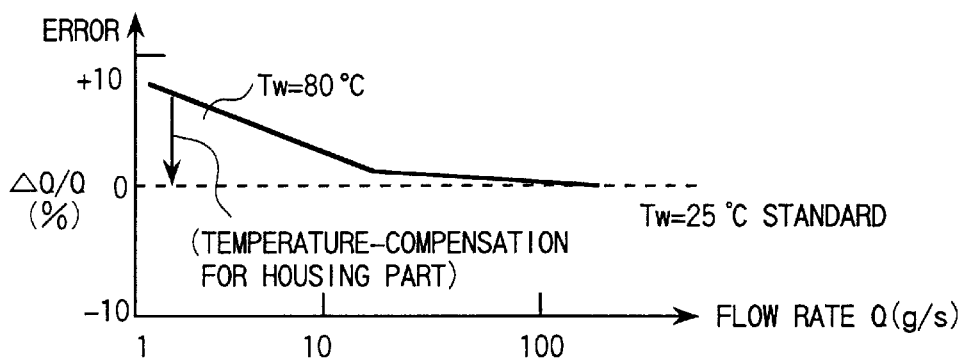
FIGS. 10A and 10B are graphs illustrating the correction of substrate temperature and the correction of air temperature, respectively.
Figure 10B:
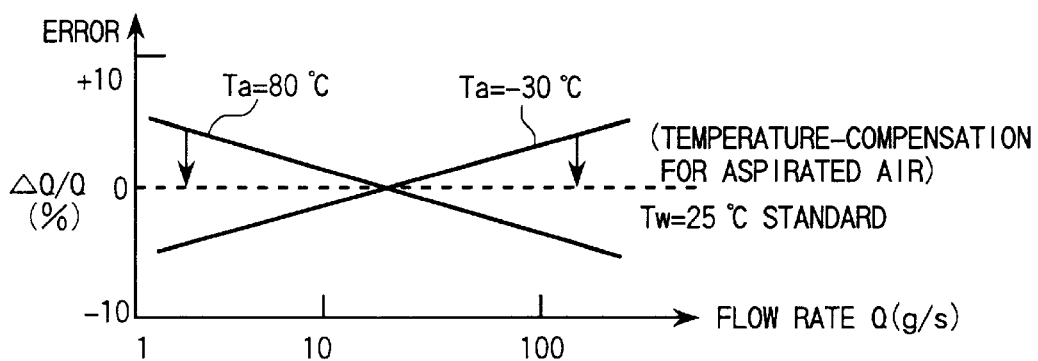

FIG. 9 shows the relationship between a portion of the measuring element shown in FIG. 1 and the temperature distribution on the line B–B' of the measuring element. Namely, the top portion of FIG. 9 shows the temperature distributions at the measuring element 1, the external circuit 13 and the housing part 12. FIG. 10(a) shows an air flow—support portion temperature characteristic of the mass air flow meter 24, and FIG. 10(b) shows an air flow—aspirated air temperature characteristic of the mass air flow meter 24.

Next, in operation, the amount of air flow is measured as follows. In the bridge circuit shown in FIG. 7, the resistance value of each of the resistors 19a, 19b is set so that the temperature (resistance value) of the heating resistor 3 positioned at the center of the measuring element 1 can become higher by a predetermined value (e.g., 150° C.) than the temperature (resistance value) of the temperature compensating resistor 4a corresponding to the air temperature. When the temperature of the heating resistor 3 is lower than the set value, a potential difference occurs between the electric potentials A and B at the central point of the bridge circuit. As a result, the transistor 17 is turned "on" by an output C of the difference amplifier 16, and the heating current is supplied to the heating resistor 3. When the temperature of the heating resistor 3 reaches the set value, the transistor 17 is turned "off" by an output C of the difference amplifier 16, and the heating current is cut off. Namely, the feedback control is carried out so that the temperature of the heating resistor 3 may be maintained at the set value. The electric potential at the point A through which the heating current is supplied is output to the control circuit 13b as a signal indicative of the air flow rate.

The temperature of the intake air (the air temperature) and that of the support portion (the substrate temperature) are measured as follows. As shown in FIG. 8, a reference voltage (Vref) is applied to the first temperature sensor 5 formed between the heating resistor 3 and the terminal electrode 8 and the second temperature sensor 4b formed at the top of the measuring element 1. Terminal voltages D, E of the temperature sensors are output to the control circuit 13b as the air temperature (Ta) and the substrate temperature (Tw), respectively.

In this embodiment, the same platinum film used as the material for both the heating resistor 3 and the temperature compensating resistor 4a is also used for the first temperature sensor 5 and the second temperature sensor 4b. Because the temperature is proportional to the electric resistance in such a metal film, the temperature from the terminal voltages of the first and the second temperature sensors can be measured. Although the reference voltage Vref is used in the circuit of FIG. 8, a constant current source can be used instead of the voltage source. Further, while the same platinum film used for the heating resistor 3 and the temperature compensating resistor 4a is used in this embodiment, a semiconductor temperature sensor such as a thermistor, a diode, a transistor, etc. also can be used as the first temperature sensor 5 and the second temperature sensors 4a. In other words, while from a view point of manufacturing, the same kind of resistor sensors as the heating resistor 3 and the temperature compensating resistor 4a (the sensor of which the thin film is formed of the same material and by the same process) is used in this embodiment, any semiconductor temperature sensors formed of the same material and by the same process as a thermistor, a diode, a transistor, etc. also can be used.

Because the temperatures of an air intake pipe 10 and the housing apart 12 shown in FIG. 3 are increased due to the heat from an automobile internal combustion engine and the like, there is a concern that the heat is transferred to the measuring element 1, and thus a measurement error occurs, namely, the temperature characteristic is deteriorated. The top portion of FIG. 9 shows the temperature distributions at the measuring element 1, the external circuit 13 and the housing part 12 given when the temperature of the housing part 12 for supporting the measuring element 1 is increased.

Referring again to FIG. 9, which shows the temperature distribution on the line B–B' of the measuring element, the heat from the internal combustion engine is transferred from the housing part 12 to the external circuit 13, and to the terminal electrode 8 of the measuring element 8, the first temperature sensor 5, the heating resistor 3, the temperature compensating resistor 4a, the second temperature sensor 4b, etc. Therefore, undesirable heat is transferred to the configuration members of the mass air flow meter such as the heating resistor 3 and the temperature compensating resistor 4b, and has an adverse effect on the measurement accuracy of the air flow rate.

Further, the heat from the external circuit 13 itself may have an adverse effect on the measurement accuracy of the air flow rate. To improve the air flow rate-substrate temperature characteristic relevant to the above-mentioned adverse effect, the correction of the substrate temperature with respect to the air flow rate is made in the present invention by using the measuring element 1 in which the first temperature sensor 5 is formed between the heating resistor 3 and the terminal electrode 8. Namely, the first temperature sensor 5 is formed between the heating resistor 3 and the terminal electrode 8, at the support portion 2a of the substrate 2, or in the neighborhood of the heating resistor 3 (in a measuring element of different configuration, the temperature compensating resistor 4a). The air flow rate is corrected by using the detected temperature from the first temperature sensor 5 and the air flow rate-substrate temperature characteristic.

In other words, the substrate temperature sensor or the first temperature sensor for detecting the typical temperature (e.g., the substrate temperature, the temperature of the support portion, etc.) is formed:

(1) at the support portion 2a (the portion of a measuring element at which the measuring element is fixed to another configuration member), (2) at a portion between the support portion 2a and the heating resistor 3, or (3) in the neighborhood of the heating resistor 3, as the portion or position suitable to detect the typical temperature or the factor indicative of the impact of the heat transfer from another configuration member to the heating resistor when the measuring element is fixed to the above member.

The temperature compensating resistor or a temperature sensing resistor described can be used in lieu of the heating resistor for measurement of an air flow rate on which undesirable heat transfer can have an effect. Accordingly, the heating resistor can be replaced with the temperature compensating resistor or the temperature sensing resistor.

FIG. 10(a) shows an air flow—support portion temperature characteristic of the mass air flow meter 24. The abscissa designates the air flow rate (Q), and the ordinate designates the error of measurement (ΔQ/Q) in which the reference value is taken when the substrate temperature is at 25° C. In the prior art meter in which compensation of the substrate temperature was not made, about 10% error at low air flow amount occurred when the substrate temperature (Tw) was at 80° C. In the present invention, the substrate temperature (Tw) can be compensated by using the measuring element 1 in which the first temperature sensor 5 is formed between the heating resistor and the terminal electrode 8. Further, because the air flow rate (Q) measured by the heating resistor 3 is input to the control circuit 13b, it is possible to compensate the air flow rate with respect to the substrate temperature (or the support portion) by retrieving the compensation data made from the air flow rate-substrate temperature characteristic and pre-stored in the memory 13c, and processing such data in the CPU of the control circuit 13b.

By applying the substrate-temperature-compensation according to the present invention, the error of an air flow rate is zero, namely equally that error at the 25° C. standard substrate temperature.

It is also possible to pre-store an air flow rate-substrate temperature characteristic inherent in each of the mass air flow meters and compensate the air flow rate with respect to the substrate temperature. The measured air flow amount (Q), the substrate temperature (Tw) and the compensation values may be pre-stored in a map, or as an approximation-error-function. The compensation of air temperature (or intake air temperature) will be explained next. In the prior art described above, the variation of the intake air temperature is compensated only by a bridge circuit constructed by using the temperature compensating resistor 4a and the heating resistor 20. Namely, in the prior art, the temperature-dependent variation of the physical properties of air, the density, the dynamic viscosity and the thermal conductivity, is not considered.

Therefore, a suitable air flow amount—air temperature characteristic can not be obtained.

Now, the solid line in FIG. 10(b) designates a prior art air flow—aspirated air temperature characteristic in which compensation of air temperature was not made. As described above, the abscissa designates the air flow rate (Q), and the ordinate designates the error of measurement (ΔQ/Q) in which the reference value is taken when the substrate temperature is at 25° C. While at a low air temperature (Ta) (e.g., −30°C.), the air flow rate has a minus error in its low flow region, and a plus error in its high flow region, at a high temperature (80° C.), the error of the air flow rate shows the reverse. Because the air temperature (Ta) can be measured by the second temperature sensor 4b, and the air flow rate (Q) measured by the heating resistor 3 is input to the control circuit 13b in the present invention, the air flow rate is compensated with respect to the substrate temperature (or the support portion) by retrieving the compensation data made from the air flow rate-substrate temperature characteristic shown in FIG. 10(a) and pre-stored in the memory 13c, and processing this data in the CPU of the control circuit 13b.

By using the substrate-temperature-compensation according to the present invention, the error of an air flow rate is reduced to zero, namely equalling the error at the 25° C. standard substrate temperature. The air flow rate-substrate temperature characteristic inherent in each of the mass air flow meters can be pre-stored and the air flow rate can be compensated with respect to the substrate temperature. The measured air flow amount (Q), the substrate temperature (Tw) and the compensation values may be pre-stored in a map, or as an approximation-error-function. While the dedicated second temperature sensor 4b is used for the measurement of the air temperature (Ta) in this embodiment, the air temperature also can be measured by calculating the variation of a resistance value of the temperature compensating resistor 4a in the CPU of the control circuit 13b, without using the second temperature sensor 4b.

Figure 11:
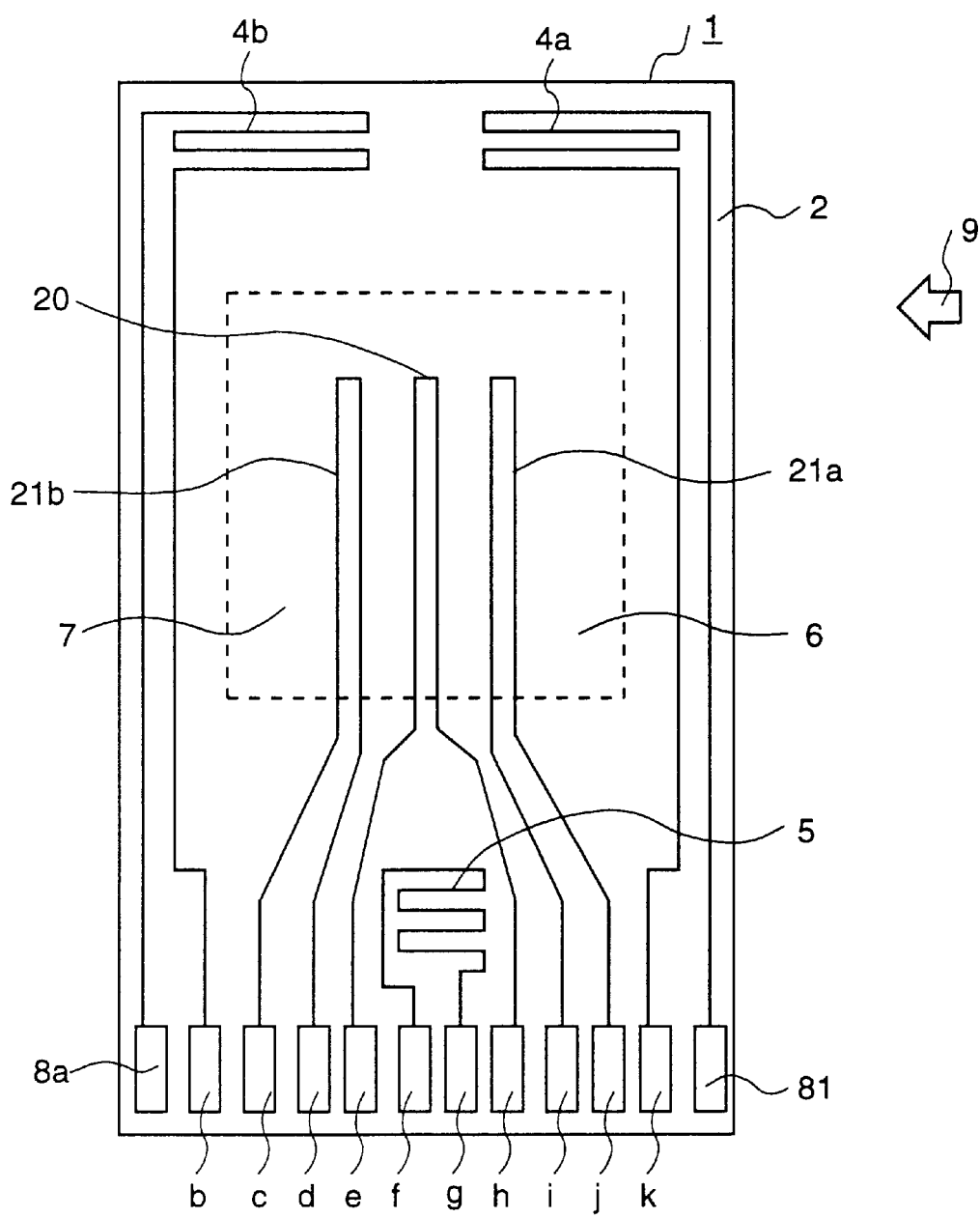
FIG. 11 is a plan view of a measuring element for the mass air flow meter according to a second embodiment of the present invention.
Figure 12:
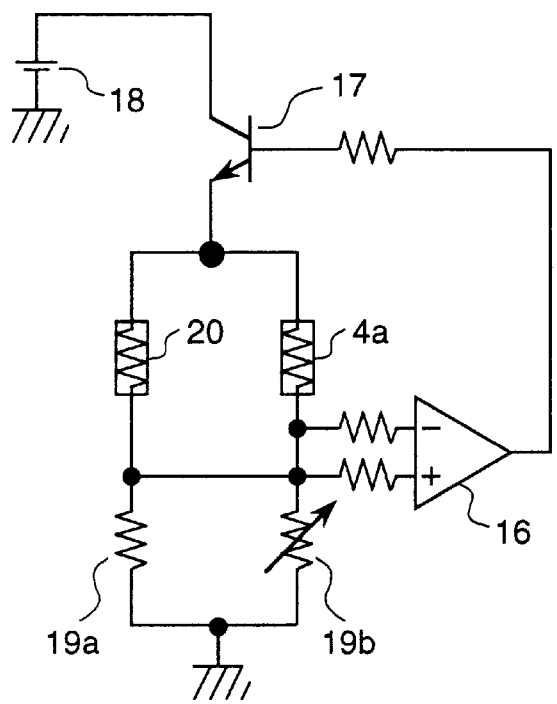
FIG. 12 is a circuit diagram for measurement of an air flow rate, used in the mass air flow meter according to the second embodiment of the present invention.
Figure 13:
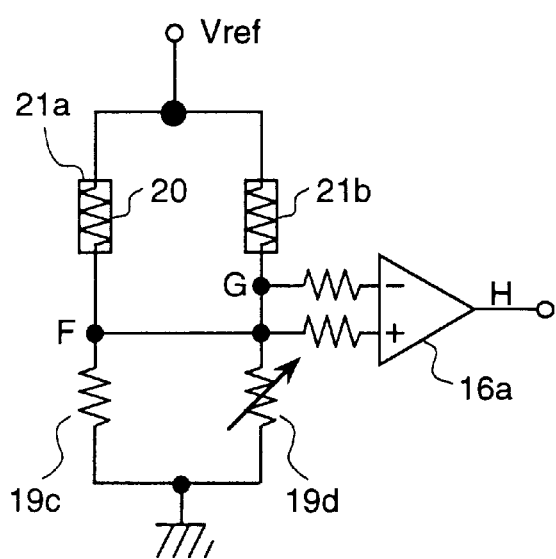
FIG. 13 is another circuit diagram for measurement of an air flow rate, used in the mass air flow meter according to the second embodiment of the present invention.

FIG. 11 is a plan view of a measuring element for the mass air flow meter according to a second embodiment of the present invention. FIG. 12 is a diagram of an operating circuit for measurement of an air flow rate used in the mass air flow meter according to the second embodiment of the present invention and having a bridge circuit with the heating resistor 20 and the temperature compensating resistor 4a. Further, FIG. 13 is a diagram of another output circuit for measurement of an air flow rate, used in the mass air flow meter according to the second embodiment of the present invention, including a bridge circuit with the operating circuit 13a and the temperature sensing resistors 21a, 21b, respectively, arranged upstream and downstream of the heating resistor 20.

Figure 16:
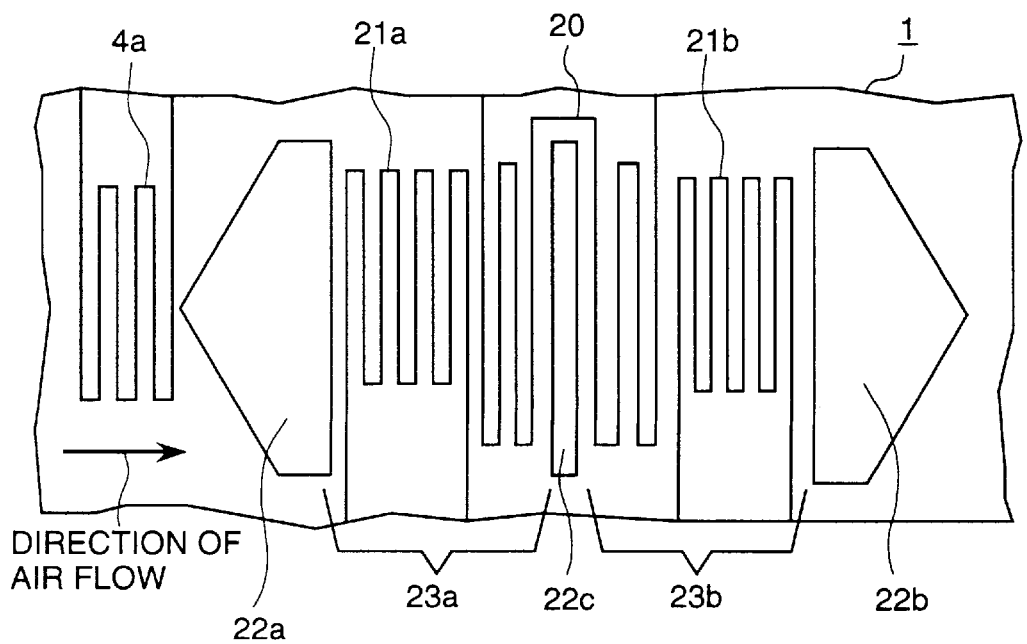
FIG. 16 is a plan view of the above-described conventional measuring element for a mass air flow meter.

The difference between the measuring elements of the first and second embodiments is as follows. In the first embodiment, a directly heating type measuring element is used, in which a heating current supplied to the heating resistor 3 is used as a signal indicative of the air flow rate. However, in the second embodiment, the air flow rate and the direction of the air flow is determined from the difference in temperature between the temperature sensing resistors 21a, 21b, respectively, arranged upstream and downstream of the heating resistor 20. This is the same type as the prior art meter of FIG. 16.

Next, in operation, the amount of air flow is measured as follows. In the bridge circuit shown in FIG. 12, the temperature of the heating resistor 20 is set so as to become higher by a predetermined value than the temperature of the temperature compensating resistor 4a. The difference of electric potentials between an F point and a G point of the bridge circuit including the temperature sensing resistors 21a, 21b, respectively, arranged upstream and downstream of the heating resistor 20, is amplified by a difference amplifier 16a. The direction of an air flow (corresponding to the sign of a voltage at an H point) and the air flow rate signal (corresponding to the absolute value of the voltage at the H point) is output to the control circuit 13b.

Because the first temperature sensor 5 and the second temperature sensor 4b are formed on the measuring element 1 in the same way as the first embodiment, and the substrate temperature (Tw) and the air temperature (Ta) are input to the control circuit 13b, the air flow rate is compensated with respect to the substrate temperature and the air temperature by retrieving the compensation data made from the air flow rate-substrate temperature characteristic and air flow amount—air temperature characteristic, and pre-stored in the memory 13c, and processing this data in the CPU of the control circuit 13b.

The temperature of intake air (the air temperature) and that of the support portion (the substrate temperature) are output to the control circuit 13b as the air temperature (Ta) and the substrate temperature (Tw), respectively.

Figure 14:
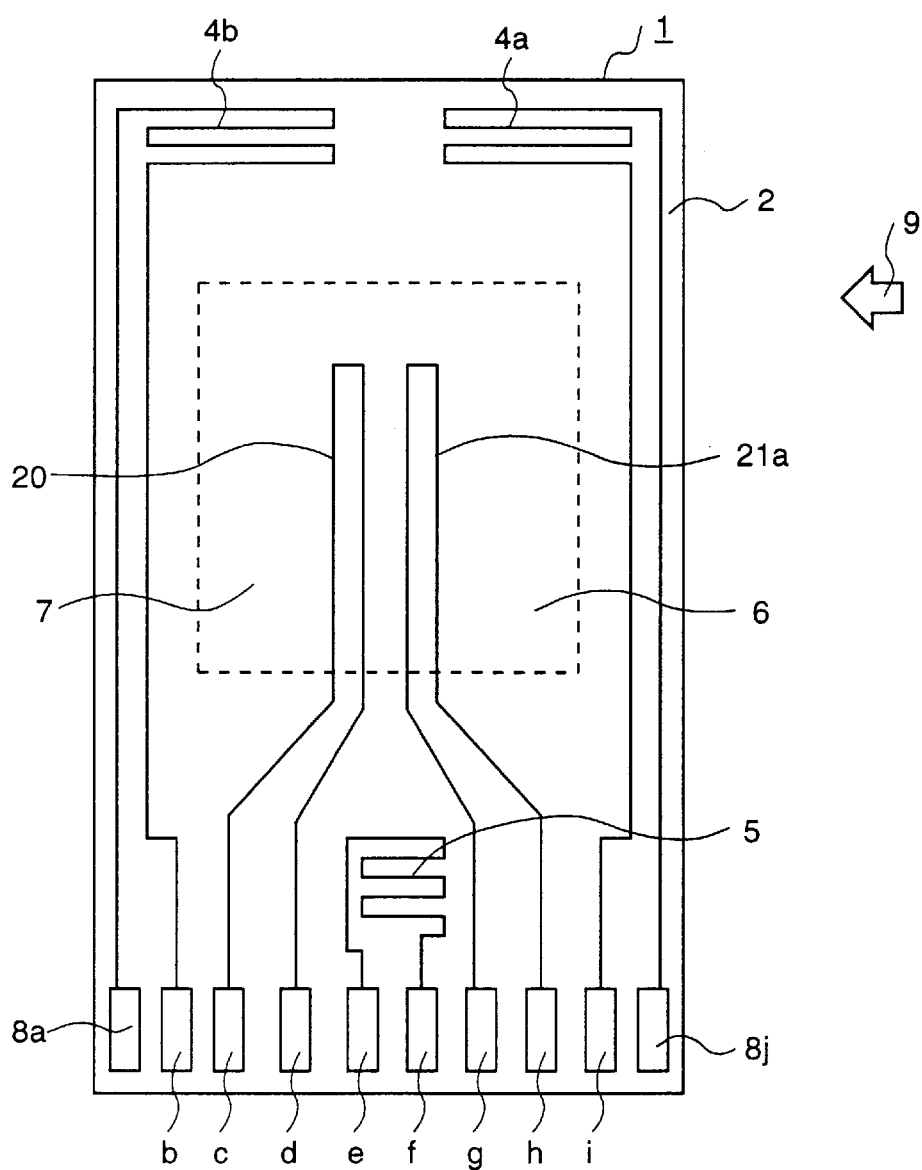
FIG. 14 is a plan view of a measuring element for the mass air flow meter according to a third embodiment of the present invention.
Figure 15:
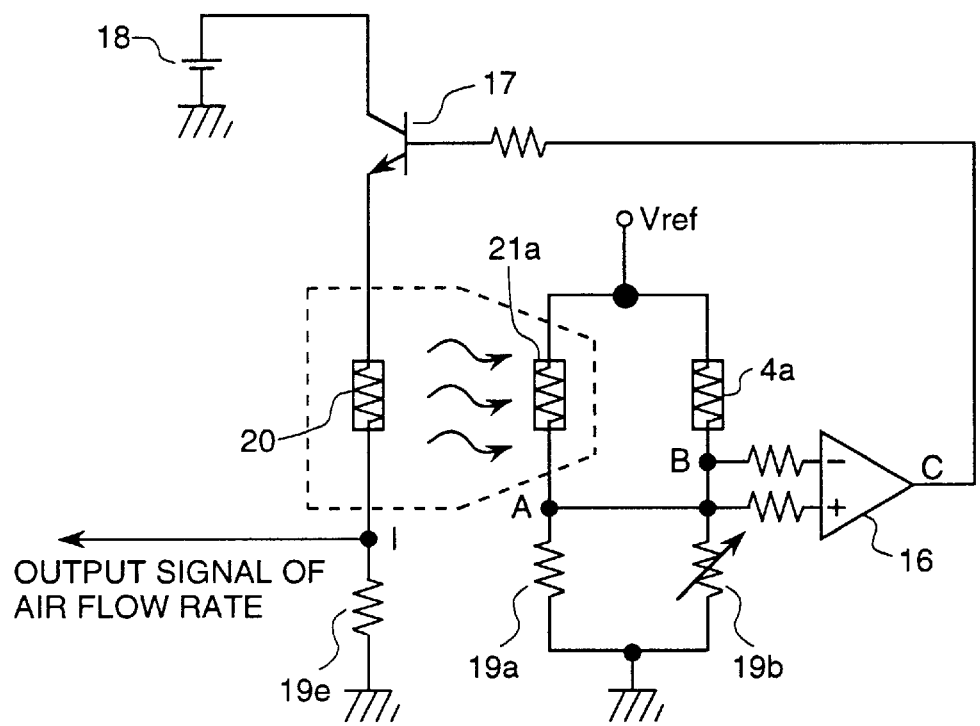
FIG. 15 is a circuit diagram for measurement of an air flow rate, used in the mass air flow meter according to the third embodiment of the present invention.

FIG. 14 is a plan view of a measuring element for the mass air flow meter according to the third embodiment of the present invention. FIG. 15 is a diagram of an operating circuit for measurement of an air flow rate, used in the mass air flow meter according to the third embodiment of the present invention and includes a heating resistor 20, the temperature compensating resistor 4a and a temperature sensing resistor 21a.

While the first embodiment is of a directly heating type, an indirectly heated type is used in the third embodiment, in which the temperature of the heating resistor 20 is detected by the temperature sensing resistor 21a arranged in the neighborhood of the heating resistor 20.

Because the first temperature sensor 5 and the second temperature sensor 4b are formed on the measuring element 1 in the same way as the first embodiment, and the substrate temperature (Tw) and the air temperature (Ta) are input to the control circuit 13b, the air flow rate is compensated with respect to the substrate temperature and the air temperature by retrieving the compensation data made from the air flow rate-substrate temperature characteristic and the air flow rate—air temperature characteristic, and pre-stored in the memory 13c, and processing this data in the CPU of the control circuit 13b, as the previous embodiment.

Three embodiments have been explained hereinabove. Also in the event that another type air flow amount detecting system is used, in which the first temperature sensor 5 and the second temperature sensor 4b are formed on the measuring element 1, the air flow rate can be compensated in the following way.

The substrate temperature (Tw) from the first temperature sensor 5 formed between the heating resistor 3 and the terminal electrodes 8a–8h and the air temperature (Ta) from the second temperature sensor 4b (or the temperature sensing resistor 4a) are input to the control circuit 13b. The compensation data made from the air flow rate-substrate temperature characteristic and the air flow rate—air temperature characteristic is pre-stored in the memory 13c. The data is retrieved and processed in the CPU of the control circuit 13b, as the previous embodiment.

A concrete example of the measuring element for a mass air flow meter will be explained next with reference to FIGS. 1 and 2. As the insulator film 7a, silicon oxide ($SiO_2$), silicon nitride (SiN), etc. are formed at a thickness of 5 micron on the substrate 2 of silicon semiconductor by a CVD method. Further, the group of resistors comprised of the heating resistor 3, the temperature sensing resistor 4a, the second temperature sensor 4b and the first temperature sensor 5 are formed from platinum deposited at a thickness of 0.2 micron on the same substrate 2 by a sputtering method. Next, the resist is formed in a predetermined shape by the conventional photolithographic etching technology. Thereafter, the platinum is patterned by an ion-milling method.

After the terminal electrodes 8a–8h are formed by a gold plating method, the insulator film 7b is formed at a thickness of 0.5 micron as a protective film on the portions beside the terminal electrodes.

Finally, the air space 6 is formed from the back face of the silicon substrate 2 through a mask of silicon oxide ($SiO_2$) by anisotropic etching, and then a chip-like measuring element 1 is obtained by cutting.

While this invention has been described with reference to illustrative embodiments, this description is not intended to be construed in a limiting sense. Various modifications and combinations of the illustrative embodiments as well as other embodiments of the invention, will be apparent to those of skill in the art upon reference to the description. It is, therefore, intended that the appended claims encompass any such modifications or embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A measuring element for a mass air flow meter, comprising:
    a substrate;
    an air temperature sensor configured for measuring an air temperature of an air stream and arranged on the substrate;
    a heating resistor for measuring an air flow rate of the air flow arranged on the substrate;
    a housing for supporting the substrate, with the air temperature sensor and the heating resistor being located in the air stream; and
    a temperature sensor configured for detecting a substrate temperature operatively arranged on the substrate, wherein the temperature sensor is located inside of the housing and outside of the air stream, and the substrate temperature is used for correcting the detected air stream.

2. The measuring element according to claim 1, wherein the temperature sensor is configured to detect heat emitted from at least one of an internal combustion engine and an evaluation circuit and transferred to the heating resistor.

3. The measuring element according to claim 1, wherein the temperature sensor and the air temperature sensor are comprised of the same material as the heating resistor.

4. The measuring element according to claim 1, wherein the temperature sensor and the air temperature sensor comprise semiconductors.

5. The measuring element according to claim 4, wherein the semiconductors are one of a thermistor, a diode and a transistor.

6. A mass air flow meter, comprising:

a measuring element including a heating resistor on a substrate for measuring an air stream;

an operating circuit for supplying a current to the measuring element and for detecting a signal indicative of the air flow;

a control circuit for calculating the air flow based on a representative signal;

a temperature sensor configured for detecting a substrate temperature arranged on the substrate; and a memory configured for storing compensation data for an air flow rate-substrate temperature characteristic, wherein the control circuit is operative to compensate the air flow by using the compensation data and the temperature obtained from the temperature sensor.

7. The mass air flow meter according to claim 6, wherein a housing covers the temperature sensor to prevent a direct contact with the air flow.

8. The mass air flow meter according to claim 6, wherein an air temperature sensor configured for detecting an air temperature, which is formed at the substrate outside of the air flow, is in operative contact with the heating resistor.

* * * * *